Figure 1:
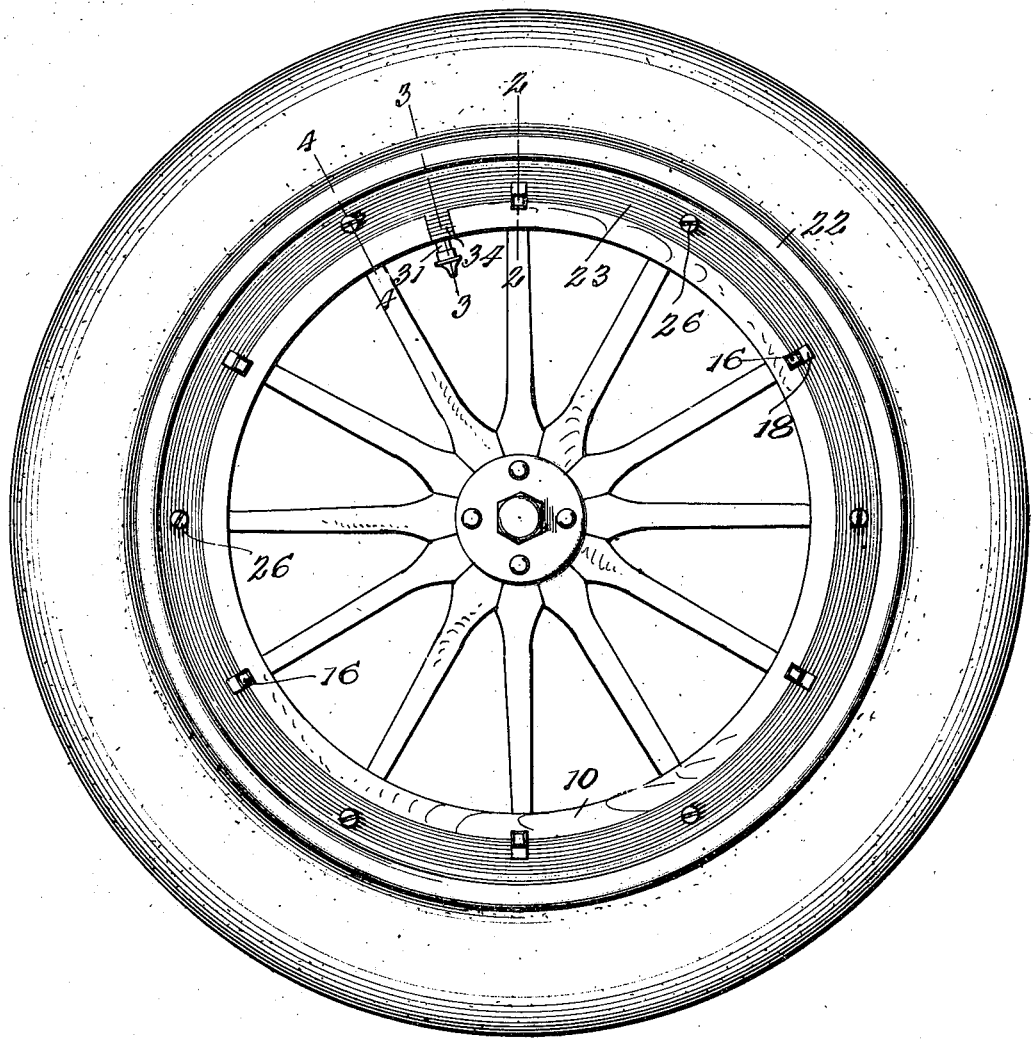

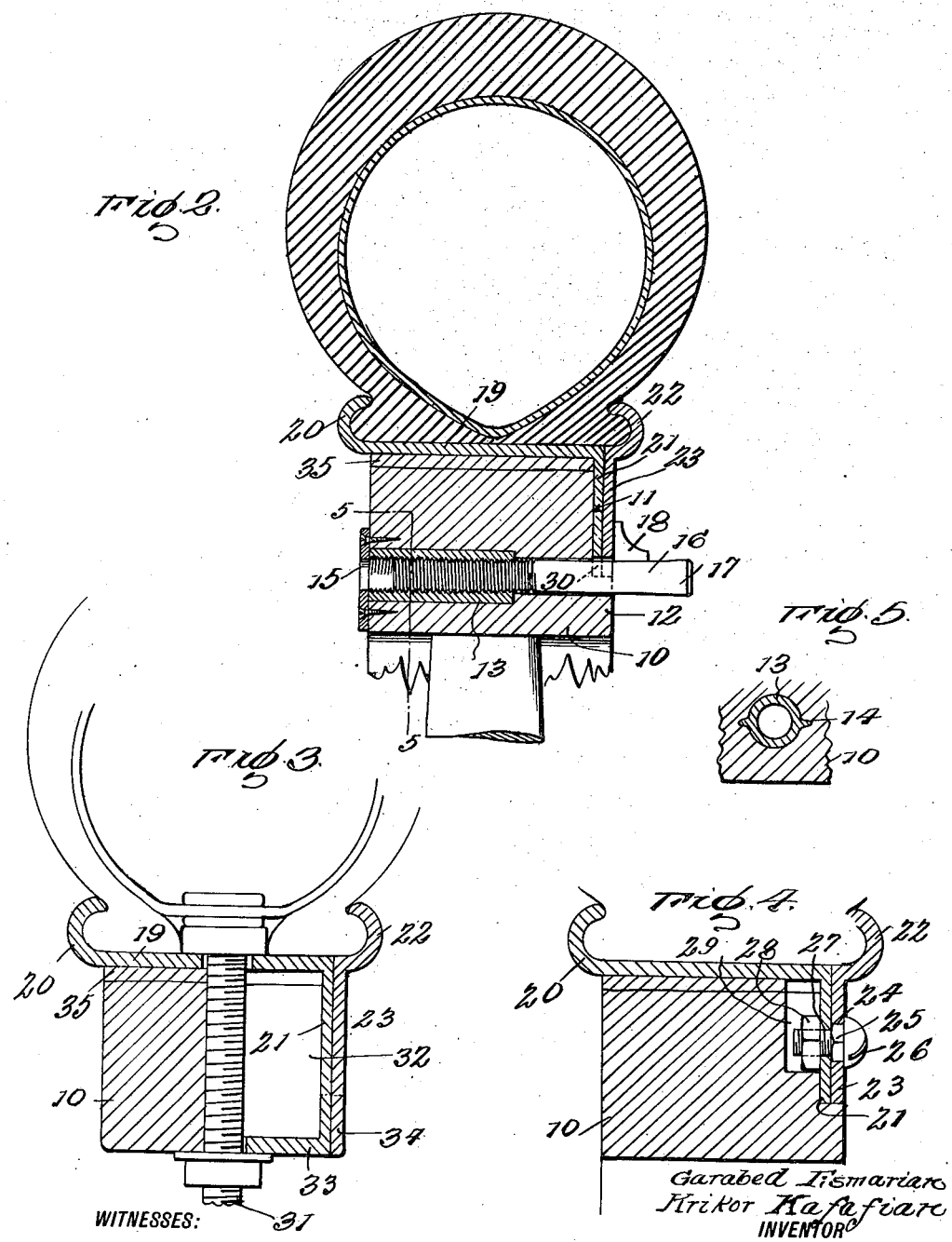

UNITED STATES PATENT OFFICE.

GARABED ESMARIAN AND KRIKOR KAFAFIAN, OF PATERSON, NEW JERSEY.

DEMOUNTABLE RIM.

1,353,573.                    Specification of Letters Patent.    Patented Sept. 21, 1920.

Application filed June 17, 1919. Serial No. 304,748.

*To all whom it may concern:*

Be it known that we, GARABED ESMARIAN and KRIKOR KAFAFIAN, citizens of the United States, residing at Paterson, in the county of Passaic and State of New Jersey, have invented certain new and useful Improvements in Demountable Rims, of which the following is a specification.

This invention has relation to demountable rims for vehicle wheels, and has for an object to provide a rim designed to hold a tire of either the clencher or straight sided type and to permit the removal of the tire with facility when occasion demands.

Another object of the invention is to provide a demountable rim which is divided circumferentially into two parts designed to embrace the sides of the tire, each part having a radial flange to be held together by bolts or the like, the entire rim when thus assembled being removable or replaceable upon a felly of ordinary type.

A still further object of the invention is to provide a demountable rim having the characteristics above set forth, and a novel securing means to be embodied in the felly, consisting of rotatably mounted bolts designed in one position to engage the flanges of the rim to secure the latter in place, or when moved to an opposite position to permit the disengagement of the rim from the felly without removing the bolts as an entirety.

In addition to the foregoing, this invention comprehends improvements in the details of construction and arrangement of parts, to be hereinafter described and particularly set forth in the appended claim.

In the accompanying drawings similar and corresponding parts are designated by the same characters of reference throughout the several views in which they appear.

Figure 1 is a view in side elevation of a vehicle wheel embodying our improvement.

Figs. 2, 3 and 4 are detailed sections taken on the lines 2—2, 3—3, and 4—4 of Fig. 1, and Fig. 5 is a detail section taken on the line 5—5 of Fig. 2.

With reference to the drawing, 10 indicates the felly of a vehicle wheel, in the present instance having its outer face cut away as at 11 for a distance extending from the outer periphery to a point adjacent the inner periphery, defining a shoulder 12 for a purpose to be presently noted. The felly is perforated transversely to receive sleeves 13 which extend inward from the inner face of the felly to a point beyond the medial portion thereof, each sleeve 13 having a pair of ribs 14 at opposite sides to be seated in recesses or embedded in the wood of the felly to prevent rotation of the sleeve after the latter had been driven in place. A washer 15 may be applied to the inner face of the felly over the end of the sleeve if desired to prevent dislodgment of the latter and to form a neat finish. The inner surface of the sleeve is threaded as shown. Extending into each sleeve is a bolt 16 having its outer end squared as at 17 and extending beyond the outer face of the felly, and each bolt having a laterally extending lug 18.

The rim consists of a main section 19 having one edge bent inward as at 20 to engage the bead of a pneumatic tire of the clencher type while at the opposite edge a flange 21 is formed which extends inwardly and radially and also circumferentially of the rim and is designed to abut at its inner edge against the shoulder 12. The section 19 of the rim extends practically the full width of the felly. The other section comprises a curved portion 22 to engage the opposite bead of the tire and also an inwardly extending radial and circumferential flange 23 to be applied to the face of the flange 21 and also to abut against the shoulder 12. The flange 23 is formed with a plurality of square openings 24 to receive the squared portion 25 of bolt 26, the inner reduced and threaded ends of the bolts entering apertures 27 in the flange 21. Nuts 28 are then applied to the inner ends of the bolts and by tightening the nuts the flanges 21 and 23 are securely held together. Of course, the sections 20 and 22 of the rim when thus assembled are designed to engage the beads of the tire and to securely hold the latter in place, the entire structure thus assembled being subsequently applied to the felly of the wheel in the manner shown in Fig. 2. Recesses 29 are formed in the outer face of the felly to receive the nuts and ends of the bolts 26 and 28. The flanges 21 and 23 are preferably cut away slightly as at 30 at uniformly spaced points around their circumference to receive the bolts 16, and to secure the rim in place said bolts 16 are rotated to dispose the lugs 18 thereof upward and in contact with the outer flange 23 thus securing the entire rim structure in place. In order to permit the valve stem 31 to be readily inserted in place we provide a lateral recess 32 in the felly as shown clearly in Fig. 3, and at this point the inner flange 21 is extended downwardly and then inwardly at 33 to inclose said recess 32, the outer flange 23 also having an inner radial extension 34 as shown. Also, the outer surface of the felly may have applied thereto a circumferential band 35 to reinforce the structure and to permit the rim to be driven in place if neecssary without injuring the felly.

Thus, it will be seen that we have provided a novel form of demountable rim which may be easily disassembled to permit removal of the tire without the necessity of special tools or extraordinary effort as in the case of the convention type of rim for holding clencher tires. It will also be seen that it is unnecessary to entirely remove the bolt 16 in order to permit the rim to be removed, all the parts of the securing means remaining in place thus preventing their loss. Other uses and advantages will readily occur to those skilled in the art to which this invention appertains.

While we have illustrated and described our invention with some degree of particularity, we realize that in practice various alterations therein may be made. We therefore reserve the right and privilege of changing the form of the details of construction or otherwise altering the arrangement of the correlated parts without departing from the spirit of the invention or the scope of the appended claim.

Having thus described our invention, what we claim as new and desire to secure by United States Letters Patent is:

The combination with a rim having an annular flange, of a wheel felly having an annular recess in one side to receive the flange and a plurality of circumferentially arranged transverse openings, an internally threaded sleeve seated in each opening, said sleeve extending approximately half way through the felly and having one end lying flush with one surface of the felly, a washer applied to the flush end of the sleeve and felly, means for securing the washer in place, a bolt insertible in the opposite end of each opening and into each sleeve and threadedly engaged therein, an outwardly tapering squared portion formed on each bolt, and a lug extending laterally from each bolt adapted to bear against the flange when the bolts are rotated to secure the rim in place.

In testimony whereof we affix our signatures in presence of two witnesses.

GARABED ESMARIAN. [L. S.]
KRIKOR KAFAFIAN. [L. S.]

Witnesses:
JAMES TOMAI,
FRANK KEARNEY.